March 29, 1938. G. B. BENTZ 2,112,662
BATHTUB SEAT
Filed July 8, 1937 2 Sheets-Sheet 1

Inventor
George B. Bentz
By H. B. Wilson & Co
Attorneys

March 29, 1938.  G. B. BENTZ  2,112,662
BATHTUB SEAT
Filed July 8, 1937  2 Sheets-Sheet 2
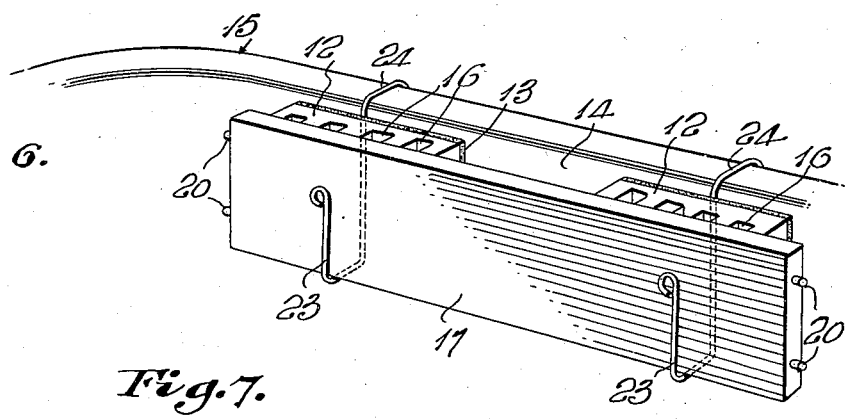
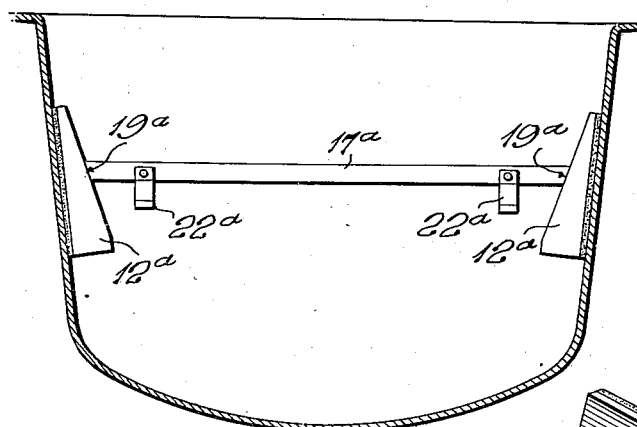
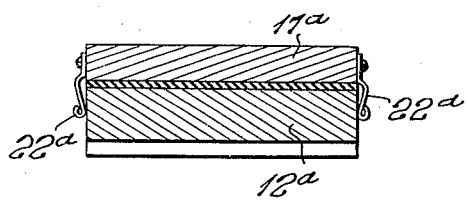
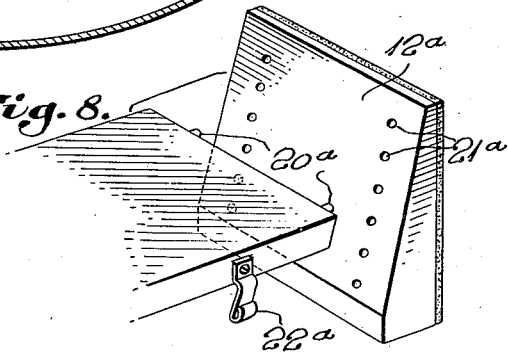
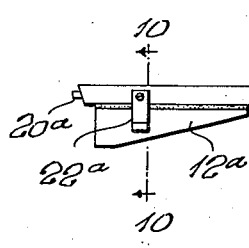
Inventor
George B. Bentz
By H. B. Wilson &Co.
Attorney Patented Mar. 29, 1938

2,112,662

UNITED STATES PATENT OFFICE 2,112,662

BATHTUB SEAT

George B. Bentz, New York, N. Y.

Application July 8, 1937, Serial No. 152,638

7 Claims. (Cl. 4—185)

The invention aims to provide a new and improved bathtub seat of such construction as to positively prevent it from slipping.

A further object is to provide a seat which is readily adjustable vertically to the most desired elevation.

Two side boards are provided to lie frictionally against the inner sides of the usual downwardly converging side walls of a bathtub, and a seat board is detachably connected with said side boards, and a further object of the invention is to provide novel means for compactly holding the side boards against the seat board when the device is not in use.

Yet another object is to provide hangers for jointly supporting the seat board and the side boards when they are disconnected and held in compact relation, as above explained.

Yet another aim is to provide a comparatively simple and inexpensive construction which may be easily manufactured and may be sold at a reasonable price.

With the foregoing and minor objects in view, the invention resides in the novel subject matter hereinafter described and claimed, description being accomplished by reference to the accompanying drawings.

Fig. 6 is a perspective view illustrating the manner in which the compactly held seat and side boards may be suspended when the device is not in use.

Fig. 7 is a transverse sectional view showing a somewhat different form of construction.

Fig. 8 is a disassembled perspective view of one end of the seat shown in Fig. 7.

Fig. 9 is an edge view showing the seat and side boards of Figs. 7 and 8 held in compact relation.

Fig. 10 is a detail transverse sectional view on line 10—10 of Fig. 9.

Figure 1:
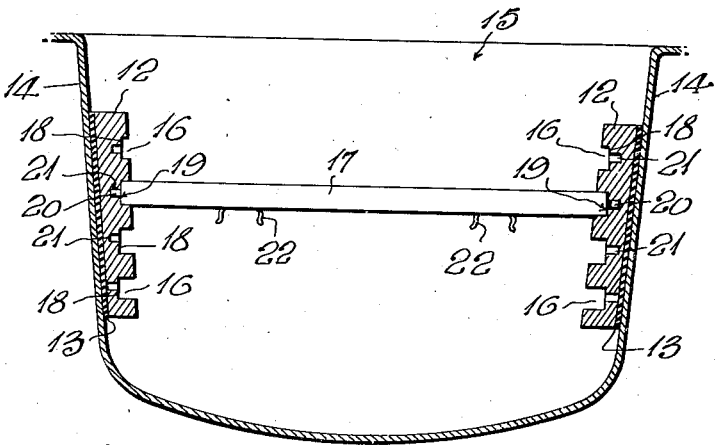
Fig. 1 is a transverse sectional view showing one form of the invention in place within a bathtub.
Figure 3:
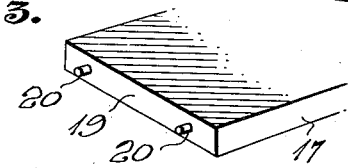
Fig. 3 is a detail perspective view of one end of the seat board.
Figure 2:
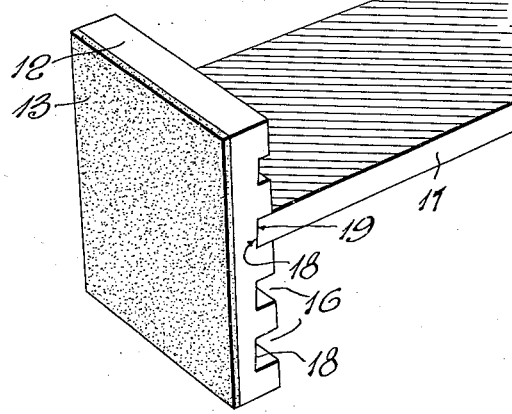
Fig. 2 is a perspective view showing the seat of Fig. 1 removed from the tub.
Figure 4:
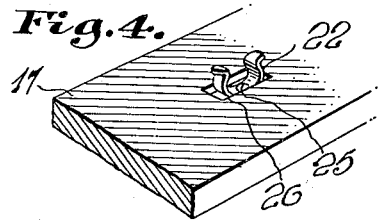
Fig. 4 is a detail sectional perspective view showing one of the clips for holding the side boards against the seat board, when the device is not in use.

Preferred features of construction have been illustrated and will be rather specifically described, with the understanding however, that within the scope of the invention as claimed, variations may be made. Furthermore, it is to be understood that while I have referred to a seat board and side boards, it is not necessary that these members be formed from wood, and metal or any desired composition could be used if desired, the term "board" being employed merely for convenience.

In the form of construction shown in Figs. 1 to 6, two side boards 12 are shown having coverings 13 of rubber or other yieldable material upon their outer sides, to lie frictionally against the inner sides of the usual downwardly converging side walls 14 of a bathtub 15. The inner side of each side board 12 is provided with a plurality of vertically spaced horizontal grooves 16, any of which may receive the ends of a seat board 17, the seat board being therefore connectable with the side boards in such manner as to permit vertical adjustment as may be desired. The inner side walls 18 of the grooves 16, which walls abut the end surfaces 19 of the seat 17, are spaced different distances from the outer sides of the side boards 12, the uppermost of said walls 18 being preferably the greatest distance from the outer sides of the side boards 12 and the lowermost of said walls 18 being the least distant from said outer sides.

Not only is the vertically adjustable characteristic of the seat 17 of advantage to adapt it to the user's convenience, but if the seat should be used in a relatively wide tub and the side boards 12 should therefore descend to an abnormal distance in said tub, the seat may be so positioned with respect to said side boards that it will not be uncomfortably low. Similarly, if the device be used in a relatively narrow tub and the side boards 12 will not therefore descend as far as usual, the seat board may be adjusted with respect to said side boards so that the seat will not be inconveniently high. Whenever the device is applied to the tub, the weight of the person sitting upon the seat board 17, tends to downwardly force the side boards 12, causing them to tightly wedge into place, anti-slippingly holding the entire device.

If desired, in addition to providing the grooves 16 for holding the ends of the seat board 17, said ends may be provided with projecting studs 20 and the groove walls 18 may be formed with sockets 21 to receive said studs.

Figure 5:
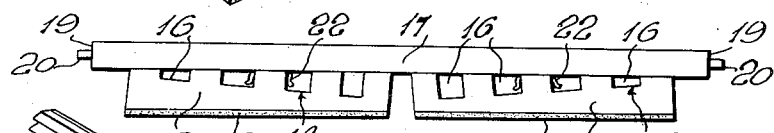
Fig. 5 is an edge view illustrating the seat board and the side boards held in compact relation by the clips.

I preferably provide two spring clips 22 on the lower side of the seat board 17 for holding the end boards 12 compactly against one side of said seat board when the device is not in use, as seen most clearly in Fig. 5, the ends of the clips 22 being receivable in some of the adjacent grooves 18 of said side boards 12. With the seat and side boards thus compactly held, they may be engaged with U-shaped portions 23 of suitable hangers 24 hooked over the sides of the tub or otherwise mounted, to hold the device compactly in an out-of-the-way position when its use is not desired. Hangers such as 24 may also be employed for supporting the seat structure hereinafter described.

While I have shown the clips 22 secured by screws 25 in grooves 26 formed in the lower side of the seat board 17, said clips might be otherwise mounted if desired.

In Figs. 7 to 10, the end boards 12a are upwardly tapered and the end faces 19a of the seat board 17a are steeply inclined to abut the inner sides of said side boards at any desired elevation, projecting studs 20a being shown on the seat board and vertically spaced stud-receiving sockets 21a being shown in the side boards 12a, for connecting said seat and side boards. The action of this form of construction is the same as that previously described, in that it permits vertical adjustment of the seat and causes tight wedging of the device in the tub to prevent any possibility of slippage.

Spring clips 22a are shown on the edges of the seat board 17a for holding the side boards 12a compactly against one side of said seat board when the device is not in use, as seen in Figs. 9 and 10, and with the device in this compact condition, it may be conveniently placed in an out-of-the-way position, for instance, engaged with hangers such as those above described (Fig. 6).

Figure 11:
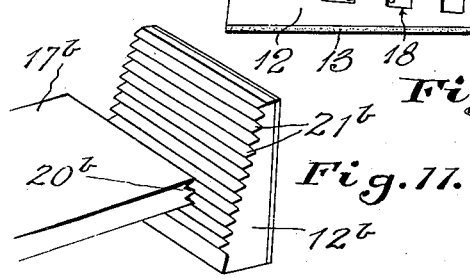
Fig. 11 is a view similar to Fig. 8 but showing a further variation.

In Fig. 11, the seat-board 17b is provided at its ends with corrugations, those at one end of said board being shown at 20b. The inner sides of the side boards, one of which is shown at 12b, are provided with corrugations 21b engageable with the corrugations 20b of the seat-board 17b. Otherwise, the construction shown in Fig. 11, may be considered as identical with that shown in Figs. 7 to 10 inclusive.

While excellent results may be obtained from the features of construction herein disclosed, attention is again invited to the possibility of making variations within the scope of the invention as claimed, and to the fact that any desired material or materials may be used. Furthermore, it is to be understood that the device may be of any preferred design and attractively finished in any suitable way.

I claim:

1. A bathtub seat comprising two downwardly converging side boards to lie frictionally against the inner sides of the usual downwardly converging side walls of a bathtub, a seat board extending between said downwardly converging side boards, and vertically spaced means on said side boards for connecting said seat board with said side boards at any of a plurality of elevations.

2. A bathtub seat comprising two side boards to lie frictionally against the inner sides of the usual downwardly converging side walls of a bathtub, said side boards each having at least one upper inwardly facing seat-abutting surface and at least one lower inwardly facing seat-abutting surface, the upper seat-abutting surfaces being spaced one distance from the outer sides of the side boards and the lower seat-abutting surfaces being spaced a different distance from said outer sides of said side boards, a seat board whose ends are adapted to abut either said upper or said lower seat-abutting surfaces, and means for holding said seat board and said side boards against relative movement.

3. A bathtub seat comprising two downwardly converging side boards to lie frictionally against the inner sides of the usual downwardly converging side walls of a bathtub, the inner sides of said side boards being each provided with at least two vertically spaced horizontal grooves, the inner walls of the upper grooves being spaced one distance from the outer sides of said side boards and the inner walls of the lower grooves being spaced a different distance from said outer sides of said side boards, and a seat board whose ends are receivable in either said upper or said lower grooves, the end surfaces of said seat board being adapted to abut said inner walls of the grooves.

4. A bathtub seat comprising two side boards to lie frictionally against the inner sides of the usual downwardly converging side walls of a bathtub, said side boards each having at least one upper inwardly facing seat-abutting surface and at least one lower inwardly facing seat-abutting surface, the upper seat-abutting surfaces being spaced one distance from the outer sides of the side boards and the lower seat-abutting surfaces being spaced a different distance from said outer sides of said side boards, a seat board whose ends are adapted to abut either said upper or said lower seat-abutting surfaces, and projecting studs on said ends of said seat board, said side boards having sockets opening through said upper and lower seat-abutting surfaces to receive said studs.

5. A bathtub seat comprising two downwardly converging side boards to lie frictionally against the inner sides of the usual downwardly converging side walls of a bathtub, the inner sides of said side boards being provided with vertically spaced corrugations, and a seat board extending between said side boards and having corrugations on its ends engageable with those of said side boards.

6. A bathtub seat comprising two side boards to lie frictionally against the inner sides of the usual downwardly converging side walls of a bathtub, said side boards each having at least one upper inwardly facing seat-abutting surface and at least one lower inwardly facing seat-abutting surface, the upper seat abutting surfaces being spaced relatively great distances from the outer sides of said side boards and the lower seat-abutting surfaces being spaced relatively slight distances from said outer sides of said side boards, a seat board whose ends are adapted to abut either said upper or said lower seat-abutting surfaces, and means for holding said seat board and said side boards against relative movement.

7. A bathtub seat comprising two downwardly converging side boards to lie frictionally against the inner sides of the usual downwardly converging side walls of a bathtub, the inner sides of said side boards being each provided with at least two vertically spaced horizontal grooves, the inner walls of the upper grooves being spaced relatively great distances from the outer sides of said side boards and the inner walls of the lower grooves being spaced relatively slight distances from said outer sides of said side boards, and a seat board whose ends are receivable in either said upper or said lower grooves, the end surfaces of said seat board being adapted to abut said inner walls of said grooves.

GEORGE B. BENTZ.